United States Patent [19]

Tschoop et al.

[11] 4,075,751
[45] Feb. 28, 1978

[54] METHOD OF SECURING SHEET METAL TO PLASTIC

[75] Inventors: Lincoln Paul Tschoop; Marcel Alfred Steiner, both of Wichita, Kans.

[73] Assignee: The Coleman Company, Inc., Wichita, Kans.

[21] Appl. No.: 739,636

[22] Filed: Nov. 8, 1976

[51] Int. Cl.² .......................................... B23P 11/00
[52] U.S. Cl. .................................. 29/432.1; 29/432; 29/252; 29/270; 29/798
[58] Field of Search ................. 29/798, 432, 244, 252, 29/270, 432.1; 72/325; 30/363

[56] References Cited

U.S. PATENT DOCUMENTS

| | | | |
|---|---|---|---|
| 2,311,961 | 2/1943 | Parsons | 29/432.1 |
| 2,843,725 | 7/1958 | Granberg | 29/432 |
| 3,238,608 | 3/1966 | Davis | 29/432 X |
| 3,815,235 | 6/1974 | Marlar | 29/21.1 |

*Primary Examiner*—Victor A. DiPalma

[57] ABSTRACT

A hand-held tool includes a pair of oppositely-directed punch heads coupled to a pneumatic cylinder and piston rod unit by an expansion linkage. A finger-actuated lever on the tool operates a valve to supply compressed air to the cylinder and piston rod unit which actuates the linkage and drives the punch heads apart. Each punch head is provided with a tri-facial point for forming a detent in metal adjacent plastic. Part of the metal is torn at the detent and embedded in the plastic to couple the two elements together. When the lever is released, air is routed to reverse the action of the cylinder and piston rod unit.

1 Claim, 6 Drawing Figures

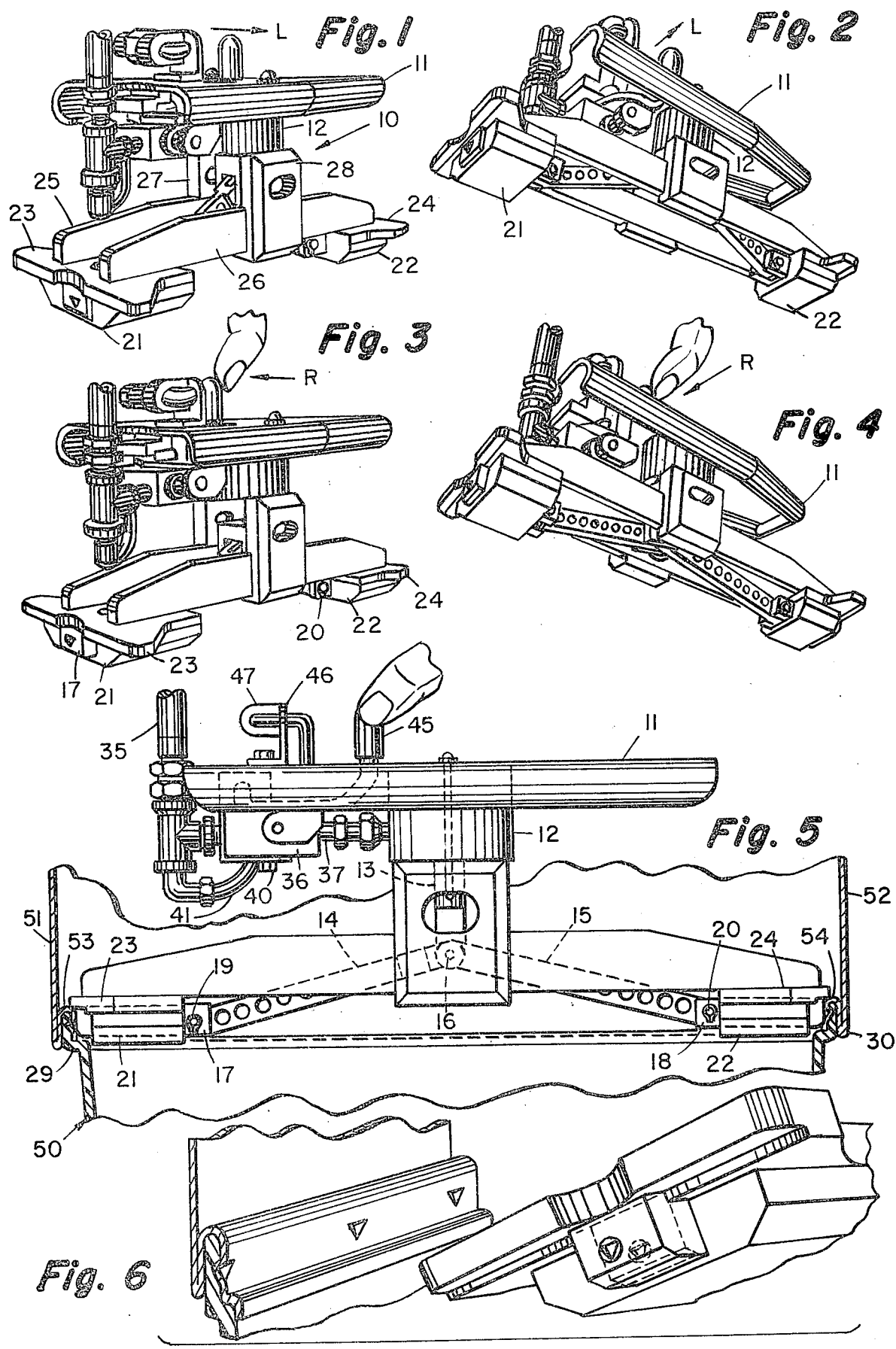

METHOD OF SECURING SHEET METAL TO PLASTIC

BACKGROUND AND SUMMARY

The present invention relates to a method and apparatus for securing sheet metal to rigid plastic. The invention is useful, as one example, for securing metal portions of picnic cooler side walls to the lower plastic portion of the cooler case.

In the construction of better picnic coolers, sheet metal is used as a covering material because of its strength and durability. Semi-rigid foam plastic is used as an insulating material in the walls of the cooler. Rigid plastic is used for the base covering. Problems have been experienced in foaming the insulation in place, and one construction uses a pre-formed rigid plastic base, which must be secured to the metal cooler base during manufacture. In the past, the metal and plastic portions of the case side walls were secured together by forming a groove in the metal portion prior to foaming. Tape was also used, so that after the foaming operation, the plastic foam expanded into the groove in the metal, and the combination of this mechanical coupling and the tape held the side wall to the base.

In some cases, during the foaming process, excess pressure might be generated which would pull the plastic base and metal wall sections apart, and thereby cause a reject.

According to the present invention, a cooler base is pre-formed of high density plastic, such as polyethylene, and it includes short upright side wall portions which partially overlap the cooler metal side walls. The metal cooler side walls are assembled to the plastic base, the lower portion of the metal side walls being formd with a groove to receive the top edge of the base. The metal side walls are secured to the plastic base by means of a hand tool which includes a pair of oppositely-directed punch heads coupled to a pneumatic cylinder and piston rod unit by an expansion linkage. The tool is aligned with the interface beween the metal and plastic, and the punch heads are spaced slightly inwardly from opposite side walls of the cooler prior to operation of the tool.

To actuate the tool, the operator pushes a lever with his finger, and this coupled pressurized air to the cylinder and piston rod unit which, in turn, when actuated, causes the linkage to expand, thereby driving the punch heads apart. Each punch head is provided with a trifacial point for forming a detent in the metal adjacent the plastic. Part of the metal is torn at the detent and embedded in the plastic to couple the two elements together. When the lever is released, air is routed to reverse the action of the cylinder and piston rod units and retract the expansion linkage, thereby withdrawing the punch heads from the metal. The cooler can then be assembled, and the side insulation foamed in place.

The present invention eliminates the need for tape previously used in the manufacture of picnic coolers, and has been found to provide a better connection between the metal and plastic base of the cooler so that during subsequent foaming, the plastic base does not separate from the metal side walls.

Persons skilled in the art will be able to understand further features and advantages of the present invention from the following detailed description of a preferred embodiment accompanied by the attached drawing wherein identical reference numerals will be used to refer to like parts in the apparatus.

THE DRAWING

FIG. 1 is a perspective view of apparatus used in connection with the present invention, taken from the left front;

FIG. 2 is a view similar to FIG. 1, but taken from a lower angle;

FIG. 3 is a view similar to FIG. 1 showing the actuation of the control lever;

FIG. 4 is a view similar to FIG. 2, but with the control lever actuated;

FIG. 5 is a side view showing the apparatus of FIG. 1 in use, with portions of the cooler assembly broken away; and FIG. 6 is a fragmentary view showing the completed connection, with the punch head separated from the connection, and illustrated in the two operating positions.

DETAILED DESCRIPTION

Referring first to FIGS. 1 and 2, apparatus for use with the present invention includes a hand-held tool generally designated by reference numeral 10. The tool 10 includes a handle 11 which may be gripped by an operator and it is in the form of an inverted channel with rounded flanges. Secured beneath the handle 11 is a cylinder and piston rod unit 12. The piston rod extends from beneath the cylinder housing and is designated 13 in FIG. 5. The lower portion of the cylinder rod 13 is connected to first and second links 14, 15 by means of a pinned connection 16. The links 14, 15, as will be understood, comprise an expansion linkage means for urging first and second punch members 17, 18 respectively outwardly in opposing directions when the cylinder and piston rod unit is actuated. The punch heads 17, 18 are pivotally connected to the outboard or distal ends of the links 14, 15, at 19, 20 respectively. These punch heads are slidably received in mounting blocks 21, 22 which are secured beneath guide members 23, 24 respectively.

The guide members 23, 24 are secured together by first and second side rails 25, 26 to form a rigid frame for the actuating mechanism. This frame includes upright elements 27, 28 which are secured to the cylinder housing of the cylinder and piston rod unit 12. Hence, the handle 11 is rigidly connected to the frame by means of the cylinder and piston rod unit.

It will be observed from FIG. 5 that the links 14, 15 comprise a pair of elongated metal bars with apertures. The apertures reduce the weight of the links and enable the punch heads, when actuated, to achieve sufficient velocity that the points actually penetrate and tear the metal. The punch points, designated respectivey 29 and 30, each have a tri-facial pointed shape, which has been found useful in tearing the metal to achieve proper attachment. Referring now to FIG. 5, a pressure air inlet conduit 35 receives air under pressure from a source (not shown), and couples it to a first two-way control valve 36. The control valve 36, in its normal position, couples the pressurized air through a conduit 37 to the return side of the piston in the cylinder and piston rod unit 12. Thus, under normal circumstances, the actuating linkage is in the retracted position, with the punch points withdrawn. It will be observed that the points are withdrawn under force, and this is helpful in removing the equipment during use. The second position of the valve 36 exhausts air from the cylinder unit 12 to the atmosphere via port 40. The inlet air source is also coupled by means of a conduit 41 to a similar valve located behind the valve 36, but not seen on FIG. 5. The second valve couples the air source, when actuated, to the work side of the cylinder in the unit 12 to extend the linkage. Both valves are operated by a finger lever 45.

At the top of the handle 11 there is secured an angle bracket 46 which is provided with a cable coupling 47. Because of the weight of the apparatus, it has been found helpful in use to at least partially offset the weight by means of an overhead cable and pulley arrangement provided with a counterweight, and toward this end, the connection 47 is adapted to be secured to a counterbalancing and pulley system.

The cylinder unit 12 is actuated by urging the lever 45 to the right, as indicated in FIGS. 3 and 4. This admits pressurized air into the upper chamber in the unit, thereby causing the rod 13 to extend and urging the expansion linkage to its extended position. At this time, air in the lower chamber of the cylinder unit 12 is exhausted to the atmosphere, as indicated above. When the lever is released, the valve 36 again admits air under pressure from the source into the lower chamber to retract the piston rod and raise it, thereby also retracting the expansion linkage. At this time, the air in the upper chamber of the cylinder unit is released to the atmosphere.

Turning now to FIGS. 5 and 6, the insulating base or bottom of a cooler is generally designated by reference numeral 50, and the bottom is broken away to show only the upper edges of the side walls. The lower edges of sheet metal side walls 51, 52 are also shown as including recesses 53, 54 respectively which fit over the upper edges of the side walls of the base 50.

It will be observed from FIG. 5 that the outer edges of the punches 17, 18 are recessed beneath the guide members 23, 24 respectively in the retracted position. Hence, the guide members 23, 24 rest on the recesses 53, 54 of the sheet metal side walls of the cooler. When the cylinder unit 12 is actuated by moving the control lever 45, the piston rod 13 is driven downwardly to expand the expansion linkage, driving the punches in opposite directions, to urge the tri-facial punch bits 29, 30 into the metal side walls of the grooves 53, 54. The force of the driving mechanism, together with the shape of the punch bits and the gauge of the metal, enables the punch bits to form a detent and partially tear the metal, as seen in FIG. 6, and this torn portion is embedded into the semi-rigid plastic base 50 to form a secure attachment between the two.

With the present invention, a reliable, yet economical means of connecting sheet metal to semi-rigid plastic foam, useful particularly in the construction of picnic coolers, has been demonstrated.

Having thus described in detail a preferred embodiment of the invention, persons skilled in the art will be able to substitute other steps for those disclosed and to modify certain of the elements illustrated while continuing to practice the principle of the invention; and it is, therefore, intended that all such modifications and substitutions be covered as they are embraced within the spirit and scope of the appended claims.

We claim:

1. A method of securing first and second metal wall portions to first and second plastic base wall portions comprising: forming an elongated groove at one edge of each of said first and second metal wall portions and assembling said grooves respectively to conforming edges of said plastic wall portions; placing first and second punch heads between said first and second metal wall portions and adjacent the opposing surfaces of the grooves thereof; said punch heads being mounted to a frame for sliding motion in opposing directions; and using pneumatic pressure to actuate a cylinder and linkage to urge said punch heads apart in linear motion, the punch points thereof indenting and at least partially tearing opposing portions of said grooves respectively, the torn portions being embedded in plastic received in said groove.

* * * * *

UNITED STATES PATENT OFFICE
CERTIFICATE OF CORRECTION

Patent No. 4,075,751      Dated February 28, 1978

Inventor(s) Lincoln Paul Tschopp et al.

It is certified that error appears in the above-identified patent and that said Letters Patent are hereby corrected as shown below:

Inventor's name should read -- Lincoln Paul Tschopp --.

Signed and Sealed this

Eleventh Day of July 1978

[SEAL]

Attest:

RUTH C. MASON
*Attesting Officer*

DONALD W. BANNER
*Commissioner of Patents and Trademarks*